July 20, 1965  N. W. LEWIS ETAL  3,195,666
AIR-CUSHION BORNE VEHICLE
Filed Jan. 15, 1963

INVENTORS
NIGEL WICKHAM LEWIS,
GEOFFREY HUGH WILLIAMS,

BY Pennie Edmonds, Morton
Taylor and Adams

ATTORNEYS 3,195,666
AIR-CUSHION BORNE VEHICLE
Nigel Wickham Lewis, Swindon, and Geoffrey Hugh Williams, Reading, England, assignors to Vickers-Armstrongs (Engineers) Limited, London, England, a British company
Filed Jan. 15, 1963, Ser. No. 251,619
Claims priority, application Great Britain, Jan. 22, 1962, 2,329/62
2 Claims. (Cl. 180—7)

This invention relates to vehicles adapted to ride on an air-cushion.

According to the present invention there is provided a vehicle adapted to ride on an air-cushion formed by forcing air through an opening in the underside of the vehicle body, there being a flexible skirt depending from the peripheral part of the underside of the vehicle body for encircling the air-cushion, the skirt comprising a front transversely extending part and two longitudinally extending side parts one on each of the two opposite sides of the vehicle, one of the transversely extending parts being formed by a member extending across the vehicle and mounted on the vehicle for rotation about a substantially horizontal axis, the rotatable member being formed at least partly of flexible material so that it can deform in the event that it encounters the ground or an obstruction when the vehicle is in motion.

Figure 1:
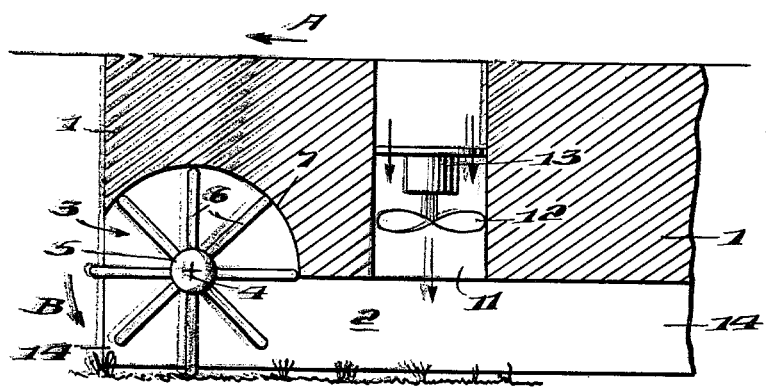
Figure 2:
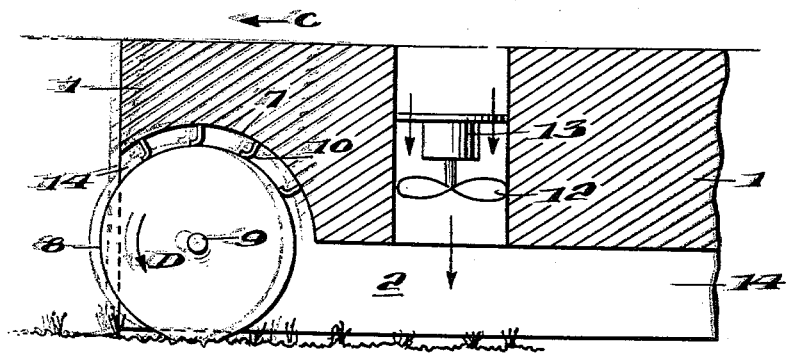

For a better understanding of the invention and to show how the same may be carried into effect, reference will now be made, by way of example, to the accompanying drawing, in which:

FIGURE 1 is a broken diagrammatic sectional elevation of the front part of an air-cushion borne vehicle, and FIGURE 2 is a broken diagrammatic sectional elevation of the front part of another air-cushion borne vehicle.

The vehicles of FIGURES 1 and 2 each have a body 1 that rides on an air-cushion 2, formed by forcing air through openings in the underside of the body 1, such as the opening 11, by means of a compressor 12 mounted in the opening 11 and driven by a motor 13 carried on the body 1. The cushion 2 is encircled by a flexible skirt 14 which depends from the underside of the peripheral part of the vehicle body 1. The two longitudinally extending side parts of the skirt are preferably formed in a manner as described in commonly owned pending U.S. application Ser. No. 252,451, filed January 18, 1963, according to which the side parts of the skirt are each formed as a portion of the length of a band in the form of a closed loop of flattened construction with top and bottom runs extending substantially horizontally. In accordance with one construction disclosed in said application the whole of each band lies in a substantially vertical plane, while in another, the top run of the band is substantially horizontal. The inner periphery of each band is secured to a chain or belt extending around spaced wheels and along upper and lower guides between the wheels. In a modified construction each band may be provided with a slide on its inner periphery which engages in a track. In either case the wheels or the slide may be driven by suitable motor means.

In the vehicle of FIGURE 1 the front transversely extending part of the skirt is formed by a member 3 rotatable about a horizontal axis 4 and extending from one side of the vehicle to the other. The member 3 has an axle 5 on which radially directed vanes 6 are mounted so that the member 3 is in the form of a paddle wheel. The radially directed vanes 6 are each of flexible material such as rubber or synthetic rubber and can be constructed in a manner similar to any of the skirt constructions described in any one of commonly owned co-pending U.S. applications Ser. No. 210,451, filed July 17, 1962, Ser. No. 211,013, filed July 19, 1962 and Ser. No. 215,713, filed August 8, 1962. These applications disclose skirt constructions of various form, such as various shapes of vertically-extending interconnected units, for example corrugated units secured together and having concave inner surfaces. These applications also disclose straight plain skirts and openings at the underside of the vehicle through which air is forced by a compressor or propeller into the air cushion. The axle 5 has its opposite ends supported in bearings (not shown) carried by the body 1. The underside of the body 1 has a recess 7 the wall of which is centred on the axis 4. The recess 7 extends from one side of the body 1 to the other. The clearance between the tips of the vanes 6 and the wall of the recess 7 is maintained as small as practicable to minimize loss of air from the cushion 2. The rear transversely extending part of the skirt is formed by a member substantially identical to the member 3, this rear member being mounted on the rear part of the body 1 in a manner similar to the mounting of the member 3. The intended direction of motion of the vehicle is indicated by the arrow A. A motor (not shown) is provided on the body 1 for driving the member 3 in the direction of the arrow B, the corresponding member at the rear of the vehicle being driven in the same direction as the member 3.

In operation of the vehicle of FIGURE 1 it advances in the direction A. The member 3 minimizes leakage of air forwardly from the cushion 2. The vanes 6, when they are below the axis 4, travel rearwardly relative to the vehicle body 1 so that whenever the lower vanes encounter an obstruction or the ground over which the vehicle is travelling the drag which such contact causes on the vehicle body 1 is minimized.

If desired the drive to the member 3 and the corresponding member at the rear of the vehicle may be omitted, these members being instead mounted for free rotation about their axes.

In the vehicle of FIGURE 2 the front part of the skirt is formed by a bag 8 of cylindrical form which is inflated with air. The bag is of flexible material such as rubber or synthetic rubber, the disc parts which close the opposite ends of the bag 8 being carried on stub axles 9 mounted in bearings (not shown) carried by the body 1. The underside of the body 1 has a recess 7 as in the vehicle of FIGURE 1 and in this recess flexible tongues 10 are mounted, the tongues being directed towards the bag 8 to contact same and form a seal between the surface of the bag and the underside of the body 1. The rear part of the skirt of the vehicle of FIGURE 2 is formed in like manner to the front part.

In operation the vehicle of FIGURE 2 moves in the direction of the arrow C and whenever the bag 8 or the corresponding bag at the rear of the vehicle encounters the ground the bag turns in the direction indicated by the arrow D. The bags may be mounted for free rotation or a motor may be provided on the vehicle body 1 for driving the bags in the direction indicated by the arrow D.

It will be understood that in both the embodiments described above the rotatable members, apart from their axles, are of flexible material so that the members can be readily deformed in the event that they encounter the ground or an obstruction when the vehicle is in motion.

We claim:
1. An air-cushion vehicle comprising a body, a flexible skirt depending from the periphery of the underside of the vehicle body, thereby defining an air-cushion space, the bottom of the skirt being ordinarily clear of the surface over which the vehicle travels, said skirt having a front transversely extending part, a rear transversely extending part, and two longitudinally extending side parts, one of said side parts arranged on each side of the vehicle, means independent of said transversely-extending parts and carried on said body for forcing air into said space, at least one of said transversely extending parts being formed by a rotatable member extending across the vehicle and mounted on the vehicle body for free rotation about a substantially horizontal axis, said rotatable member carrying flexible, radially directed vanes, the underside of the vehicle body being formed with a transversely extending recess having an arcuate wall, the clearance between said rotatable member and said wall being such that air loss therebetween is minimized.

2. An air-cushion vehicle comprising a body, a flexible skirt depending from the periphery of the underside of the vehicle body, thereby defining an air-cushion space, the bottom of the skirt being ordinarily clear of the surface over which the vehicle travels, said skirt having a front tranversely extending part, a rear transversely extending part, and two longitudinally extending side parts, one of said side parts arranged on each side of the vehicle, means independent of said transversely-extending parts and carried on said body for forcing air into said space, at least one of said transversely extending parts being formed by a rotatable member extending across the vehicle and mounted on the vehicle body for free rotation about a substantially horizontal axis, said rotatable member being in the form of a flexible cylinder bag inflated with air, the underside of the vehicle body being formed with a transversely extending recess having an arcuate wall, a plurality of flexible tongues carried by said wall and directed towards the bag for cooperation therewith to seal the gap between the rotatable member and the recess.

References Cited by the Examiner

UNITED STATES PATENTS 3,077,174  2/63  Cockerell _____ 114—67

FOREIGN PATENTS 136,636  3/61  Russia.
860,781  2/61  Great Britain.

OTHER REFERENCES

Aviation Week, July 6, 1959, pages 115–116.

FERGUS S. MIDDLETON, *Primary Examiner.*

MILTON BUCHLER, *Examiner.*